United States Patent
Tran et al.

(10) Patent No.: US 9,694,827 B2
(45) Date of Patent: Jul. 4, 2017

(54) VEHICLE COMPUTER SYSTEM WITH DATA BACKUP

(71) Applicants: Phu Tran, Renton, WA (US); David Randall Wrigley, Kirkland, WA (US); Suresh Kumar, Issaquah, WA (US); Zachary Slaton, Seattle, WA (US); Michael T. Russell, Kirkland, WA (US)

(72) Inventors: Phu Tran, Renton, WA (US); David Randall Wrigley, Kirkland, WA (US); Suresh Kumar, Issaquah, WA (US); Zachary Slaton, Seattle, WA (US); Michael T. Russell, Kirkland, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 14/578,086

(22) Filed: Dec. 19, 2014

(65) Prior Publication Data

US 2016/0176411 A1 Jun. 23, 2016

(51) Int. Cl.
*B60W 50/02* (2012.01)
*B60W 30/14* (2006.01)
(Continued)

(52) U.S. Cl.
CPC ......... *B60W 50/0225* (2013.01); *B60K 31/00* (2013.01); *B60K 35/00* (2013.01);
(Continued)

(58) Field of Classification Search
CPC .. B60W 30/146; B60W 50/085; B60W 50/12; B60W 2050/0089; B60W 2530/18
See application file for complete search history.

(56) References Cited

U.S. PATENT DOCUMENTS 6,438,563 B1 * 8/2002 Kawagoe ............ G06F 11/1658
7,610,128 B2 10/2009 O'Connor
(Continued)

FOREIGN PATENT DOCUMENTS

WO 2012/011895 A1 1/2012

OTHER PUBLICATIONS

"ECU Designing and Testing Using National Instruments Products," National Instruments, Austin, Texas, Nov. 7, 2009, 9 pages.
(Continued)

*Primary Examiner* — Thomas G Black
*Assistant Examiner* — Ce Li
(74) *Attorney, Agent, or Firm* — Christensen O'Connor Johnson Kindness PLLC (57) ABSTRACT

An on-board vehicle computing system stores values in a memory of a first engine control unit (ECU) and stores corresponding backup values in a memory of a second ECU. In this way, the second ECU provides data backup functionality for the first ECU's data. The system may retrieve a backup value from the first ECU and restore the corresponding value in the second ECU using the backup value. In one illustrative scenario, if an original engine ECU (EECU) fails and a replacement EECU is installed, the system can retrieve backup values for vehicle speed limiter (VSL) parameters from memory in a cab ECU (CECU) and update the corresponding data in the replacement EECU with the backup values.

18 Claims, 6 Drawing Sheets

(51) Int. Cl.
*B60K 35/00* (2006.01)
*F02D 35/00* (2006.01)
*B60K 31/00* (2006.01)
*G06F 11/14* (2006.01)

(52) U.S. Cl.
CPC ....... *B60W 30/146* (2013.01); *F02D 35/0007* (2013.01); *G06F 11/1456* (2013.01); *G06F 11/1469* (2013.01)

(56) References Cited

U.S. PATENT DOCUMENTS

| | | | |
|---|---|---|---|
| 8,219,279 B2* | 7/2012 | Merrick et al. | 701/33.4 |
| 2002/0161496 A1* | 10/2002 | Yamaki | 701/33 |
| 2003/0076221 A1* | 4/2003 | Akiyama et al. | 340/310.01 |
| 2008/0189006 A1* | 8/2008 | Meehan | G01C 22/02 701/31.4 |
| 2008/0294312 A1* | 11/2008 | O'Connor | G07C 5/085 701/32.5 |
| 2009/0177350 A1* | 7/2009 | Williams et al. | 701/29 |
| 2010/0004812 A1* | 1/2010 | Merrick et al. | 701/33 |
| 2013/0090820 A1* | 4/2013 | Frashure et al. | 701/70 |
| 2014/0121933 A1* | 5/2014 | Slaton et al. | 701/93 |

OTHER PUBLICATIONS

"Heavy Duty Body Builder Manual: 567, 389, 367, 365," Peterbilt Motors Company, Seattle, Wash., Mar. 2013, "Section 6: Electrical 389 Family," pp. 6-1 to 6-16; "Section 7: Electrical 579 Family," pp. 7-1 to 7-32.

Extended European Search Report mailed Jul. 6, 2016, in corresponding European Patent Application No. 15201244.9, filed Dec. 18, 2015, 9 pages.

* cited by examiner

VEHICLE COMPUTER SYSTEM WITH DATA BACKUP

BACKGROUND

Modern vehicles are equipped with computer systems that generate many different kinds of data during operation. Prior vehicle computer systems include memory for storing important vehicle data, such as diagnostic codes, for subsequent inspection and processing. However, such data is subject to loss or corruption if the system components fail or are tampered with.

Various techniques for data backup in general purpose computer systems are known. In one familiar example, a user can connect an external hard drive to a computer and periodically save backup copies of important files to the external drive. These traditional modes of data backup may be effective for recovering from loss of data on general purpose computer systems. However, vehicle computer systems are substantially different from general purpose computer systems in both design and application, making traditional modes of data backup ineffective for vehicles. When compared with general purpose computer systems, the limitations of vehicle computer systems in terms of computing power, storage capacity, and physical accessibility present unique challenges that have not been adequately addressed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, an on-board vehicle computing system obtains one or more values for a vehicle and stores the values in memory of a first electronic control unit (ECU). For example, an engine ECU (EECU) in the on-board vehicle computing system may calculate values that relate to vehicle speed limiter (VSL) functionality and store these values in the memory of the EECU. As another example, a cab ECU (CECU) in the on-board vehicle computing system may obtain an odometer value and store this value in the memory of the CECU. The on-board vehicle computing system stores corresponding backup values in a memory of a second ECU. In this way, the second ECU provides data backup functionality for the first ECU's data. For example, the CECU may store backup values of the EECU's data.

In another aspect, the system retrieves a backup value from a memory of a first ECU and restores a corresponding value in the second ECU using the backup value. In one illustrative scenario, if an original EECU fails and a replacement EECU is installed, the system can retrieve backup values for VSL parameters from memory in the CECU and update the corresponding data in the replacement EECU with the backup values.

The ECUs may be communicatively coupled to a controller area network (CAN) bus. The on-board vehicle computer system may further include a diagnostic connector to which a service tool can be connected to perform vehicle diagnostics. Such tools may benefit from the availability of backup data when the original source data stored on that ECU is no longer available.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

The detailed description set forth below in connection with the appended drawings is an illustrative and non-limiting description of various embodiments of the disclosed subject matter. The following description proceeds with reference to examples of computer systems and methods suitable for use in vehicles, such as Class 8 trucks. Although illustrative embodiments of the present disclosure will be described hereinafter with reference to trucks, it will be appreciated that aspects of the present disclosure have wide application and, therefore, may be suitable for use with many types of vehicles, such as passenger vehicles, buses, commercial vehicles, light and medium duty vehicles, etc.

It should be understood that various embodiments of the present disclosure include logic and operations performed by electronic components. These electronic components, which may be grouped in a single location or distributed over a wide area, generally include processors, memory, storage devices, input devices, etc. It will be appreciated by one skilled in the art that the logic described herein may be implemented in a variety of hardware, software, and combination hardware/software configurations, including but not limited to, analog circuitry, digital circuitry, processing units, and the like. In circumstances where the components are distributed, the components are accessible to each other via communication links.

Components described herein may be communicatively coupled by any suitable means. In one embodiment, components may be connected by an internal communications network such as a vehicle bus that uses a controller area network (CAN) protocol, a local interconnect network (LIN) protocol, and/or the like. Those of ordinary skill in the art will recognize that the vehicle bus may be implemented using any number of different communication protocols such as, but not limited to, Society of Automotive Engineers ("SAE") J1587, SAE J1922, SAE J1939, SAE J1708, and combinations thereof. In other embodiments, components may be connected by other networking protocols, such as Ethernet, Bluetooth, TCP/IP, and/or the like. In still other embodiments, components may be directly connected to each other without the use of a vehicle bus, such as by direct wired connections between the components. Embodiments of the present disclosure may be implemented using other types of currently existing or yet-to-be-developed in-vehicle communication systems without departing from the scope of the claimed subject matter. In some embodiments, a vehicle controller area network bus, or VCAN, is used to communicate vehicle operating conditions as specified by the Society of Automotive Engineers (SAE) J1939 standard.

Electronic control units (ECUs) are embedded devices that control electronic systems or subsystems in vehicles. Modern vehicle computer systems may include many ECUs dedicated to controlling specific systems or subsystems. ECUs can be implemented in a variety of hardware, software, and combination hardware/software configurations, for carrying out aspects of the present disclosure. A typical ECU includes a processor (e.g., a microcontroller), memory, input/output lines, and one or more communication links. The memory may include an electronically erasable, programmable, read-only memory ("EEPROM") or other non-volatile memory (e.g., flash memory) and/or random access memory ("RAM"). The RAM may be a volatile form of memory for storing program instructions that are accessible by the processor.

ECUs can be reprogrammed by service technicians. The ability to reprogram ECUs can be important, for example, to allow ECUs to recognize new components that are added to the system. However, the reprogrammable nature of ECUs also leaves them vulnerable to intentional tampering or inadvertent loss of data.

FIGS. 1-4 illustrate embodiments of vehicle computer systems having multiple ECUs and data backup functionality, according to various aspects of the present disclosure. In general, the use of multiple ECUs allows system functionality to be distributed among the ECUs, and avoids the need for a single ECU to handle all such functionality. In addition, as explained in detail herein, suitably configured ECUs can provide data backup functionality for each other. Depending on the data being stored, one ECU may act as the primary storage for the data, with another ECU acting as backup storage for the data.

In addition to being communicatively coupled to one another in these examples, the ECUs shown in FIGS. 1-4 also may be communicatively coupled to other ECUs, such as transmission ECUs, braking system ECUs, or the like. The ECUs also may be communicatively coupled to other system components, such as sensors (not shown) that provide information concerning the status of the vehicle (e.g., oil temperature, oil pressure, fuel temperature, coolant temperature, exhaust pressure, exhaust temperature, etc.).

ECUs may include many other features (e.g., input and output lines, connections to power sources, etc.) that are not shown in FIGS. 1-4 for ease of illustration. Further, although ECUs are depicted in FIGS. 1-4 as including a single memory component and a single control logic component for ease of illustration, it should be understood that the memory of an ECU may include two or more components (e.g., for storage of different types of data) and that the control logic of an ECU may include two more control logic components (e.g., for managing different functions of the ECU).

Figure 1:
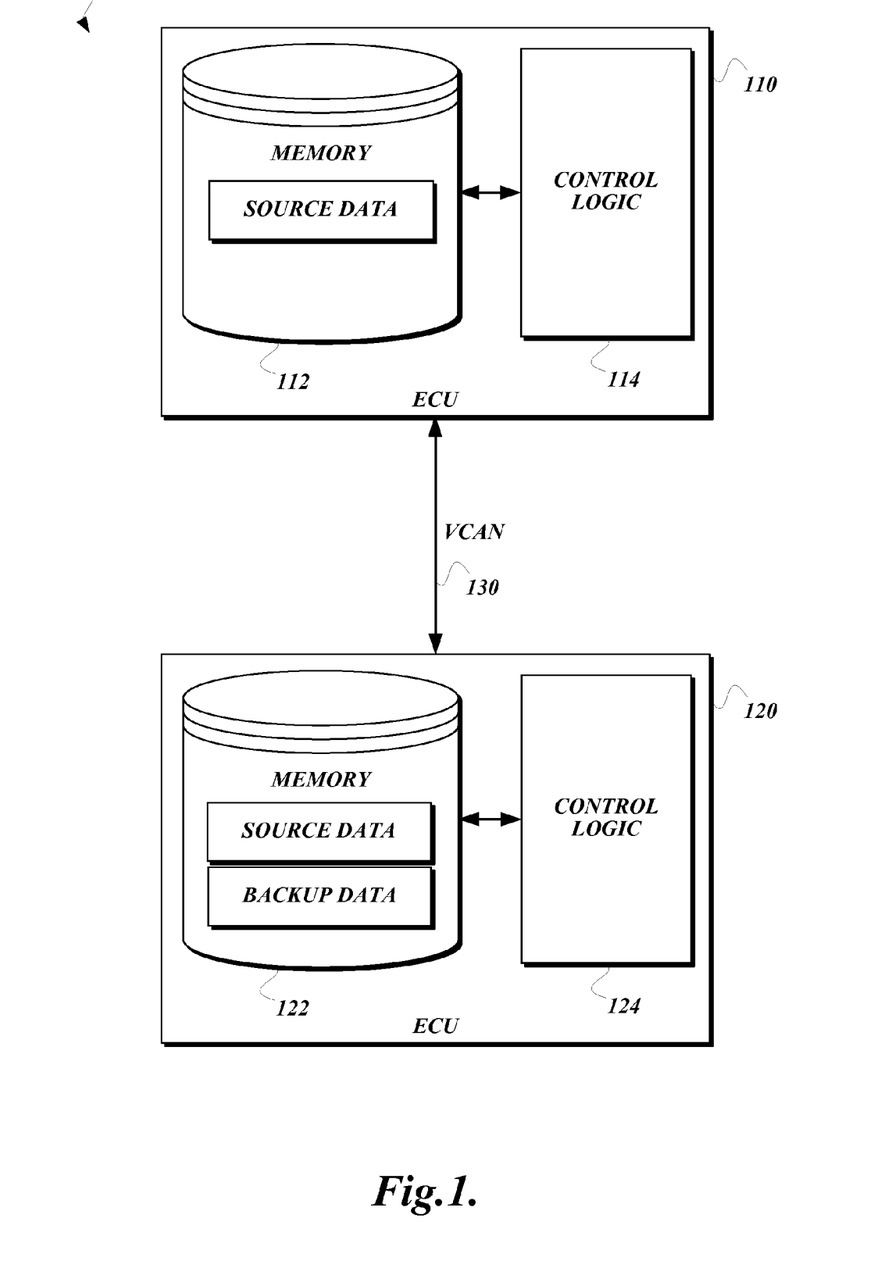
FIGS. 1-4 are schematic diagrams of illustrative on-board vehicle computer systems with data backup functionality.
Figure 2:
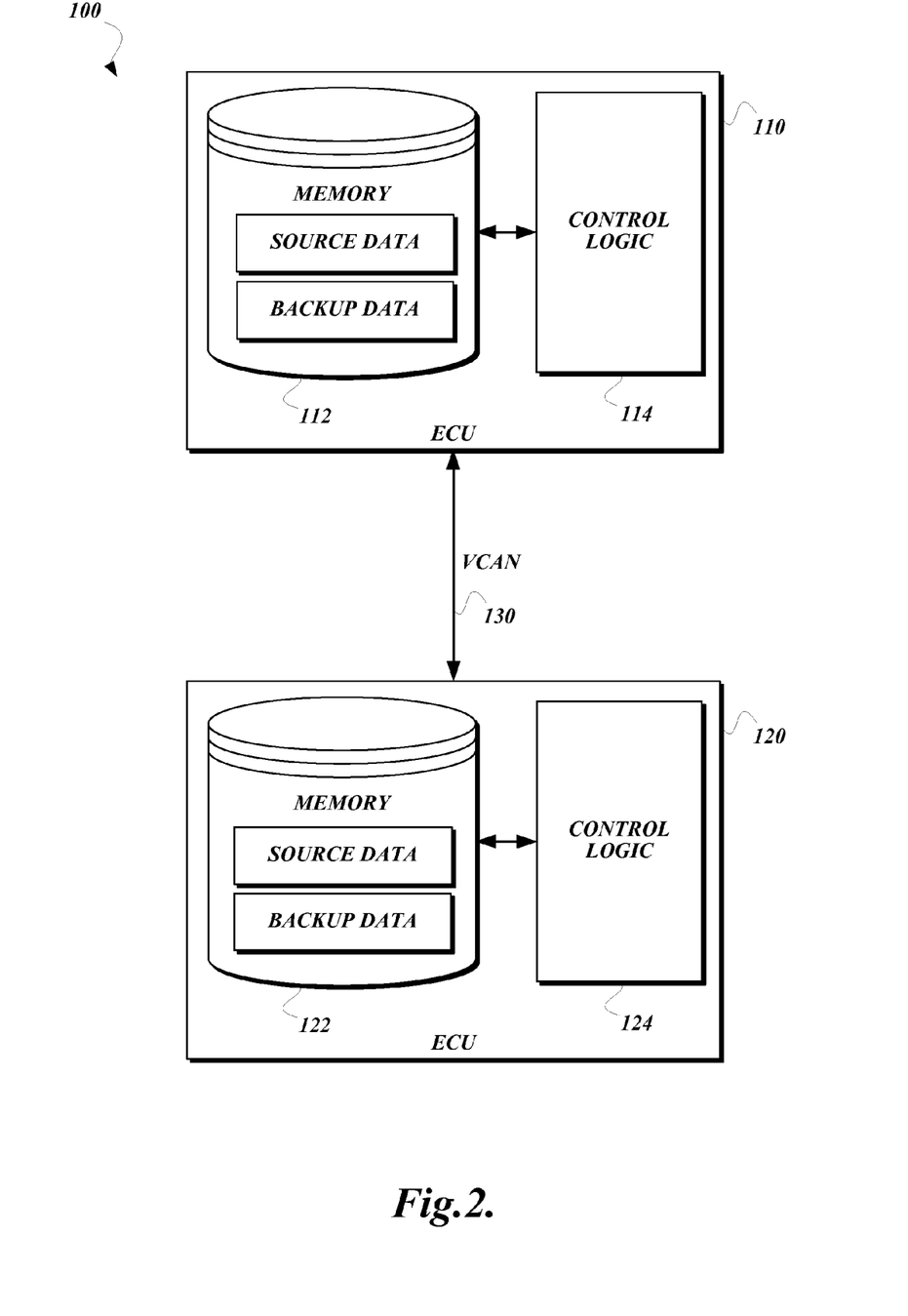

FIGS. 1 and 2 depict illustrative embodiments of an on-board vehicle computer system 100 with data backup capabilities, according to various aspects of the present disclosure. In the examples shown in FIGS. 1 and 2, ECUs 110 and 120 transmit and receive data via VCAN 130. The ECUs 110 and 120 each include memory (112 and 122, respectively) for storing data, program instructions, or the like. In at least some embodiments, memory for ECUs comprises nonvolatile memory, such as an EEPROM or flash memory, which can be used for persistent storage of data. However, other forms of volatile and/or nonvolatile storage also can be used for storage of data. The ECUs 110 and 120 also each include control logic 114 and 124 (which may include, for example, a microcontroller) that manages the function of the respective ECU.

FIG. 1 depicts an example of a single-backup arrangement, in which one ECU (ECU 120) uses its memory 122 to back up source data stored in the memory 112 of another ECU (ECU 110). FIG. 2 depicts an example of a dual-backup arrangement. In the example shown in FIG. 2, ECU 120 uses its memory 122 to back up source data stored in the memory 112 of ECU 110, which is also used to back up source data stored in the memory 122 of ECU 120. As will be understood, other arrangements are possible within the scope of the present disclosure. For example, in a system with three or more ECUs, each of the ECUs may use its memory to back up source data stored in the memory of another ECU. As another example, one ECU may be configured to use its memory to back up source data from multiple other ECUs.

Figure 3:
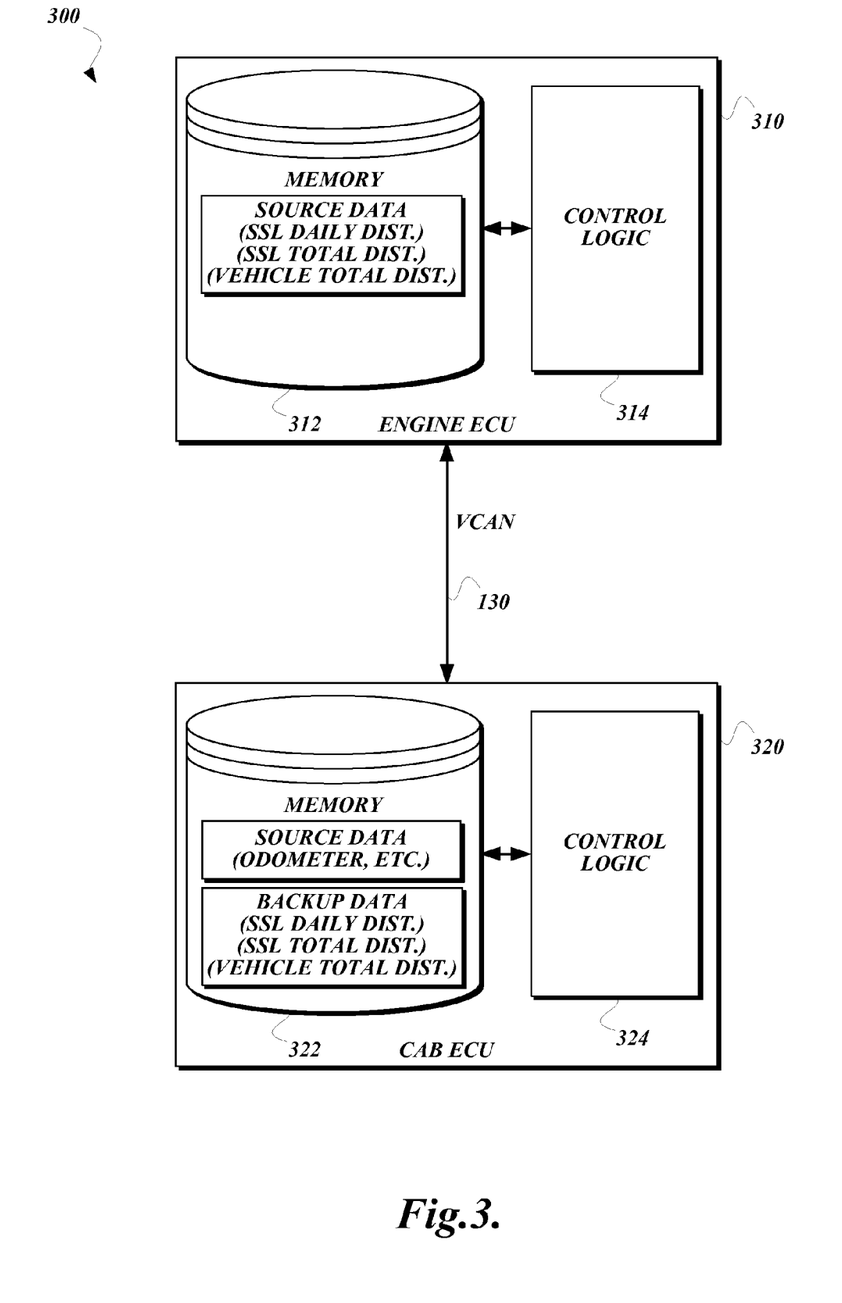
Figure 4:
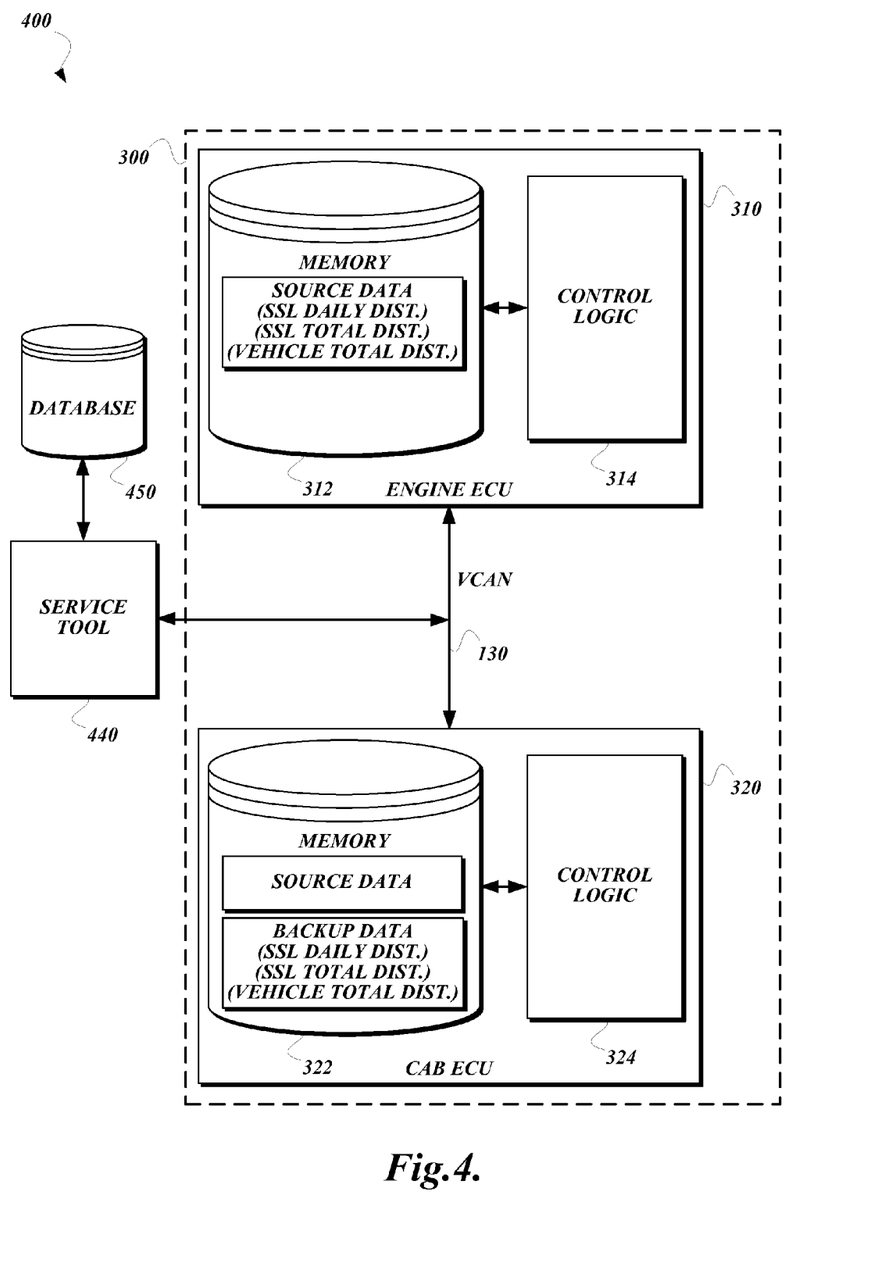

FIGS. 3 and 4 illustrate additional embodiments of an on-board vehicle computer system 300 with data backup capabilities, according to various aspects of the present disclosure. The system 300 includes an engine ECU (EECU) 310 and a cab ECU (CECU) 320. In the examples shown in FIGS. 3 and 4, the EECU 310 includes memory 312 and control logic 314. The EECU 310 manages functionality relating to the engine and related vehicle functions, including vehicle speed limiter (VSL) functionality. The CECU 320 also includes memory 322 and control logic 324. The CECU 320 manages cab-oriented functionality such as instrumentation, warning signals, displays, and the like. The CECU 320 is typically located within the cab of the truck, though it may be located elsewhere.

Greenhouse-gas (GHG) emission regulations set limits on vehicles to improve fuel efficiency of vehicle fleets and thereby reduce GHG emissions. A VSL can be helpful in this regard, because it can improve fuel economy by reducing the maximum speed of the vehicle. For example, the VSL can set a maximum speed (e.g., 64 mph) for the vehicle when it is fueled, which may be significantly below the maximum speed that the vehicle would be able to achieve without the restrictions of the VSL. Because vehicles tend to be more fuel efficient at lower speeds, limiting a vehicle's speed with a VSL tends to increase its overall fuel efficiency and decrease its GHG emissions.

In examples described herein, the VSL has an associated expiration distance (e.g., 500,000 miles), after which the vehicle can operate without VSL speed restrictions. Therefore, in some examples described herein, an expiration distance parameter called Vehicle Total Distance is tracked to determine whether the expiration distance has been reached. Also, in examples described herein, the VSL includes a "soft top speed limiter" (SSL) that allows a vehicle operator to exceed the maximum speed limit set by the VSL for a limited distance in a given day and for a limited total distance. Therefore, in some examples described herein, accumulated distance parameters called SSL Daily Distance and SSL Total Distance are tracked to determine whether the daily limit and total limit, respectively, have been reached. In practice, the amount by which the speed limit can be exceeded is usually limited to a specific offset speed.

Regulations may require some VSL-related data to be tracked throughout the life of the truck, at least until an expiration distance is reached. If the corresponding source data is corrupted or lost and no in-vehicle backup is in place, parameters such as Vehicle Total Distance, SSL Daily Distance, and SSL Total Distance may need to be replaced with last-known-good values from an external database in order to satisfy regulatory requirements. If these parameters are saved to an external database infrequently, such as when the truck is serviced at one of the manufacturer's dealerships, the last-known-good values for a particular parameter will usually be out of date, requiring a roll-back to earlier values.

A roll-back to an earlier Vehicle Total Distance value effectively increases the expiration distance for the VSL functionality, which may affect resale value. For example, if the Vehicle Total Distance data is lost at 490,000 miles and the last-known-good value from an external database is 450,000 miles, the expiration distance is effectively increased by 40,000 miles. Therefore, it can be beneficial to maintain an up-to-date, in-vehicle backup of such values. In the examples shown in FIGS. 3 and 4, the system 300 is used to preserve VSL data within the vehicle computer system even when ECUs fail and are replaced in the field.

As shown, the memory 312 of the EECU 310 is used to store source data relating to the VSL functionality. However, other source data and/or backup data also may be stored in the memory 312. As shown, memory 322 is used to store source data relating to the functionality managed by the CECU 320 (e.g., odometer readings), in addition to functioning as backup storage for source data in the EECU 310 (e.g., data relating to the VSL functionality). However, other source data and/or backup data also may be stored in the memory 322.

A CECU with backup data can receive and respond to requests for the backup data. To ensure that requests are valid, the CECU may be programmed to respond only to data requests that specify a valid source address and/or destination address. The CECU also may be programmed to indicate a particular source address when responding to such requests. The source address in the response may be designed to distinguish the requested backup data (e.g., backup VSL data) from other data (e.g., an odometer value) stored in the CECU.

If an ECU is replaced (due to failure, tampering, or for some other reason), the new ECU may automatically obtain backup values. For example, referring to the computer system 400 depicted in FIG. 4, a service tool 440 can connect to the on-board vehicle computer system 300 via VCAN 130 during installation of a replacement EECU 310. In at least one embodiment, the service tool 440 comprises an Electronic Service Analyst (ESA) diagnostic tool provided by PACCAR Inc. A replacement EECU may lack up-to-date VSL source data in the memory 312. The service tool 440 can initiate a process that allows the new EECU 310 to automatically obtain up-to-date VSL data, eliminating the need for manual reviews of VSL parameters and reducing the possibility of tampering or of inadvertent programming errors by service technicians. The service tool 440 can also save the up-to-date VSL data in a database 450, providing a further level of protection against data loss and tampering.

Figure 5:
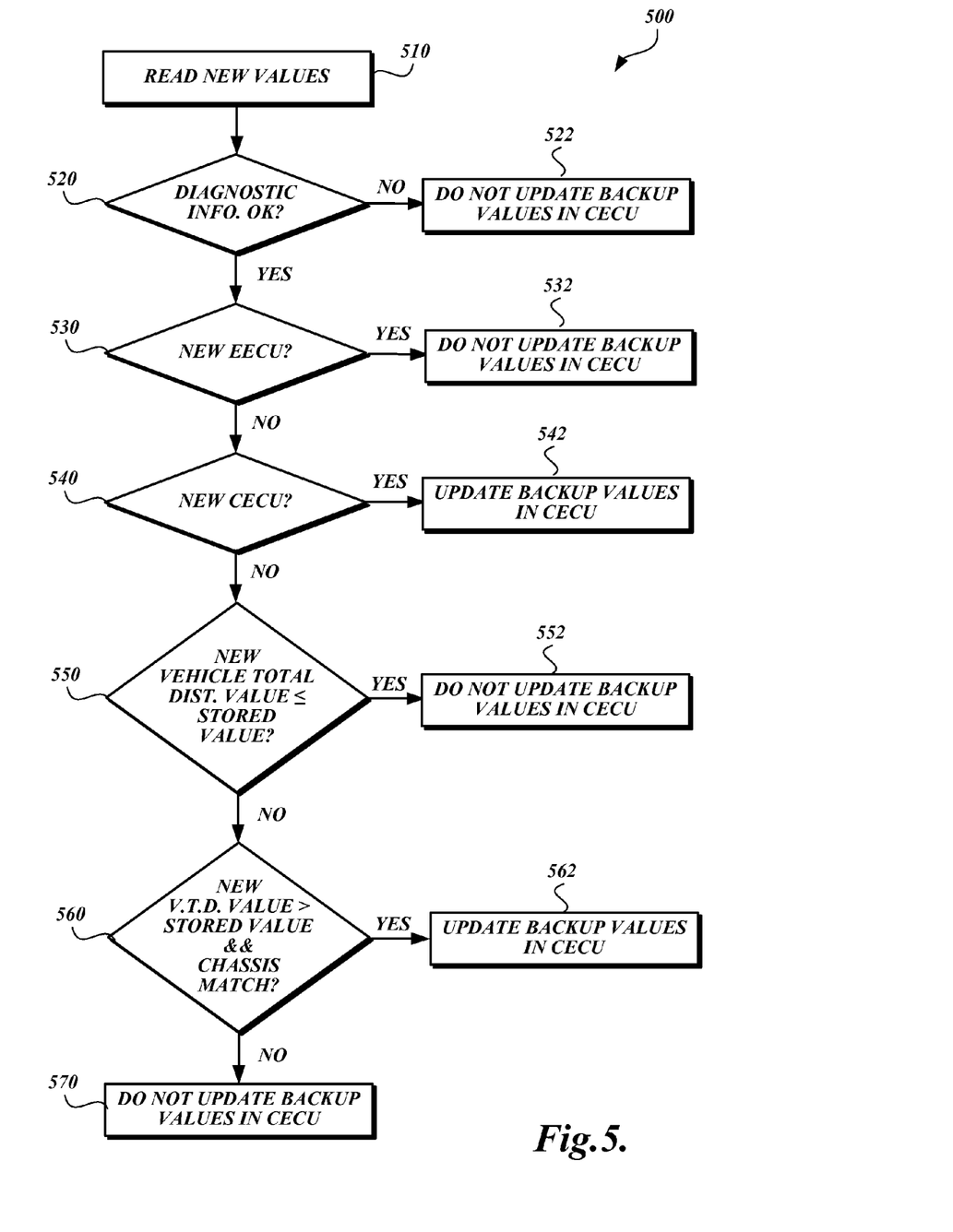
FIGS. 5-7 are flow diagrams of illustrative methods that may be implemented by systems such as the on-board vehicle computing systems depicted in FIGS. 1-4.

FIG. 5 is a flow diagram of a process 500 that a CECU (e.g., CECU 320) can follow to update VSL backup values. In at least one embodiment, the CECU obtains new values from an EECU (e.g., EECU 310) and determines whether to replace previously stored backup values with the new values or keep the previously stored values. The CECU makes this determination based on factors such as whether the EECU is operating normally with respect to the VSL functionality, and how the new values compare to the previously stored backup values. In at least one embodiment, the EECU broadcasts new values on the VCAN at a frequency of 1 Hz, and the CECU listens for the broadcasted values.

At step 510 of the illustrative process 500, the CECU reads data obtained from the EECU (e.g., via the VCAN 130). In this example, the data obtained from the EECU includes VSL data values as well as diagnostic information. At step 520, the CECU processes the diagnostic information to determine whether the EECU is operating normally. If the EECU is not operating normally, the CECU chooses not to update the backup VSL values at step 522.

If the EECU is operating normally, the CECU determines whether the EECU is new (e.g., a replacement for a failed EECU) at step 530. In at least one embodiment, the CECU makes this determination by comparing a hex value associated with at least one of the VSL parameters (e.g., the Vehicle Total Distance value) to a hex value known to be associated with a new EECU (e.g., 0 or 0xFFFFFFFF). If the EECU is new, the CECU chooses not to update the backup VSL values at step 532.

Other steps also can be performed if the EECU is new. For example, the backup values currently stored in the CECU can be used to update the new EECU. This process may be initiated by a service technician. Referring again to FIG. 4, in at least one embodiment, upon connection of the service tool 440 to the on-board vehicle computing system 300, the service tool 440 may display a message to remind a technician to update the VSL values in the new EECU. Alternatively, the updating of the VSL values in a replacement EECU may occur automatically.

If the EECU is not new, the CECU determines whether the CECU is new (e.g., a replacement for a failed CECU) at step 540. In at least one embodiment, the CECU makes this determination by comparing a hex value associated with at least one of the backup VSL parameters (e.g., the Vehicle Total Distance value) to a hex value known to be associated with a new CECU (e.g., 0 or 0xFFFFFFFF). If the CECU is new, the CECU updates the backup VSL values with the new values at step 542.

If the CECU is not new, the CECU compares the new values obtained from the EECU to the previously stored backup values. In the example shown in FIG. 5, at step 550 the CECU compares a new Vehicle Total Distance value with the stored backup Vehicle Total Distance value. If the new value is less than or equal to the stored value, the CECU chooses not to update the backup VSL values at step 552.

If the new value is greater than the stored value, at step 560 the CECU determines whether the new value and the stored backup value are associated with the same truck (e.g., by checking whether the same Chassis ID is associated with the new value and the stored backup value). If so, the CECU updates the backup VSL values with the new values at step 562. If not, the CECU chooses not to update the backup VSL values at step 570.

Figure 6:
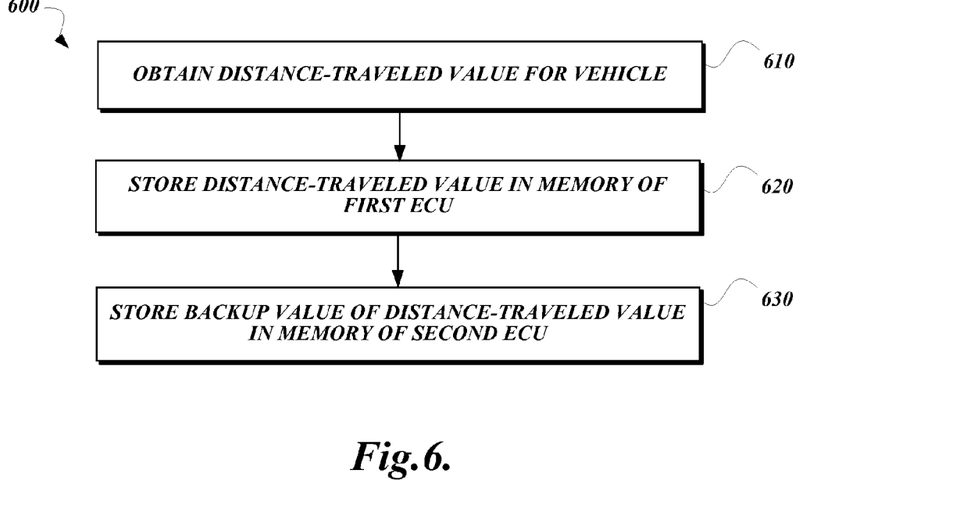

FIG. 6 is a flow diagram of an illustrative data backup method 600 that may be implemented by the on-board vehicle computing system 300 described above, or by some other system. In the illustrative method 600, the on-board vehicle computing system obtains one or more distance values for the vehicle at step 610 and stores the distance values in a memory of a first ECU at step 620. For example, an EECU in the on-board vehicle computing system may calculate distance values that relate to VSL functionality, such as Vehicle Total Distance, SSL Daily Distance, or SSL Total Distance and store these values in the memory of the EECU. As another example, a CECU in the on-board vehicle computing system may obtain an odometer value and store this value in the memory of the CECU. At step 630, the on-board vehicle computing system stores a backup value of the distance value in a memory of a second ECU. In this way, the second ECU provides data backup functionality for the first ECU's source data. For example, the CECU may store backup values of Vehicle Total Distance, SSL Daily Distance, or SSL Total Distance in the memory of the CECU. As another example, the EECU may store a backup value of the odometer value in the memory of the EECU.

Figure 7:
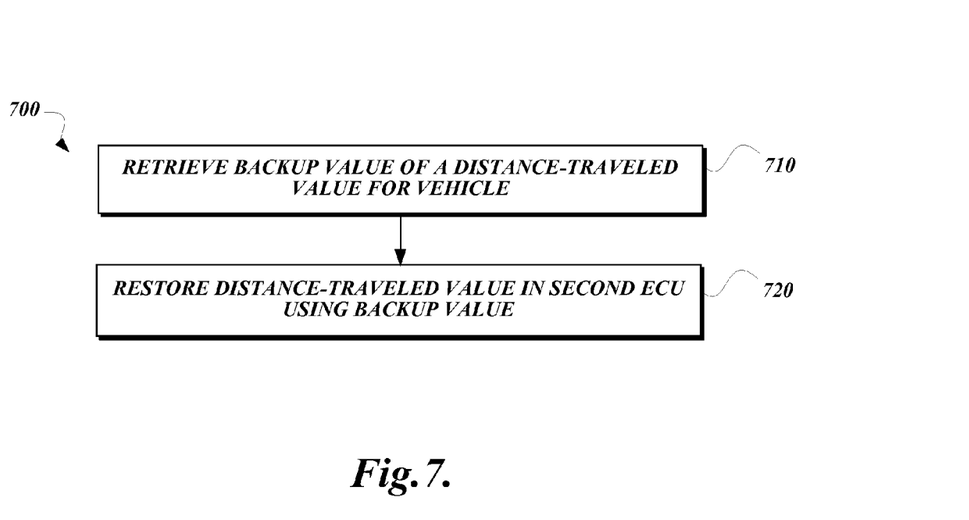

FIG. 7 is a flow diagram of an illustrative data restoration method 700 that may be implemented by the on-board vehicle computing system 300 described above, or by some other system. In the illustrative method 700, at step 710 the system retrieves a backup value of a distance value for a vehicle from a memory of a first ECU in an on-board vehicle computer system. At step 720, the system restores the distance value in the second ECU using the backup value. In one illustrative scenario, if an original EECU fails and a replacement EECU is installed, the system can retrieve backup values for VSL parameters (e.g., Vehicle Total Distance, SSL Daily Distance, or SSL Total Distance) from memory in the CECU and update the source data in the replacement EECU (which may be initially set to default values at installation) with the backup values.

Extensions and Alternatives

Many alternatives to the described methods are possible. For example, processing stages in the various methods can be separated into additional stages or combined into fewer stages. Processing stages in the various methods also can be omitted or supplemented with other methods or processing stages. Furthermore, processing stages that are described as occurring in a particular order can instead occur in a different order and/or in a parallel fashion, with multiple components or software processes concurrently handling one or more of the illustrated processing stages. As another example, processing stages that are indicated as being performed by a particular device or module may instead be performed by one or more other devices or modules.

Many alternatives to the vehicles and systems described herein are possible. Although illustrative details of vehicle computing systems are described with reference to FIGS. 1-4, it should be understood that alternative systems and methods can be implemented and used in accordance with the present disclosure. Further, it should be understood that, in practice, a fully-functional vehicle computer system may have additional components (e.g., sensors, control modules, output devices, input devices, and the like) that are not shown in FIGS. 1-4 for ease of illustration. For example, on-board vehicle computing systems may include an operator interface comprising an operator display (not shown), such as an LCD display. In a touchscreen configuration, the operator display may have input capabilities. The operator interface also may include special purpose lighted displays, needle gauges, and/or the like, or other output devices such as speakers or haptic feedback devices to provide information to the operator. The operator interface also may include other input devices including buttons, toggles, keyboards, mechanical levers, and any other devices that allow an operator to the on-board vehicle computing system.

Different vehicles may have different features and may generate different types of vehicle data that may be suitable for data backup in accordance with techniques described herein. For example, as an alternative to or in addition to backing VSL data values, systems described herein also can provide backup functionality for expiration distance or other values that may be tracked for engine idle shutdown timer (EIST) functionality, or any other values.

Although some examples described herein are directed to vehicles with vehicle speed limiters that may be required to comply with greenhouse gas emission standards or other regulations, it should be understood that aspects of the systems and related processes described herein transcend any particular type of vehicle (whether regulated or unregulated) and may be applied to vehicles employing an internal combustion engine (e.g., gas, diesel, etc.), hybrid drive train, or electric motor.

Although examples described herein relate to on-board vehicle computer systems, such systems also may work in combination with other computer systems that are not on board a vehicle. For example, a suitably equipped vehicle may communicate with other computer systems wirelessly, e.g., via a WiFi or cellular network. Such systems may provide remote data processing and storage services, remote diagnostics services, or other services. For example, remote diagnostics services can benefit from being able to obtain backup values from a functioning ECU if another ECU that originally generated the data has failed or been tampered with.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiment of the invention in which an exclusive property or privilege is claimed are defined as follows:

1. An on-board vehicle computer system of a vehicle, comprising:
   a first electronic control unit (ECU);
   a second ECU; and
   computer-readable media having stored thereon program instructions configured to, when executed, cause the on-board vehicle computer system to perform steps comprising:
   obtain a first vehicle speed limiter (VSL) distance value for the vehicle;
   store the first VSL distance value in a memory of the first ECU;
   store a backup value of the first VSL distance value in a memory of the second ECU;
   read data obtained from the first ECU, wherein the data includes VSL data values and diagnostic information, and wherein the VSL data values include a new VSL distance value;
   process the diagnostic information to determine whether the first ECU is operating normally;
   determine whether the first ECU is a new ECU;
   determine whether the second ECU is a new ECU;
   perform a comparison of the new VSL distance value with the stored backup value;
   perform a comparison of a chassis ID associated with the new VSL distance value and a chassis ID associated with the stored backup value;
   update the stored backup value if: (a) the first ECU is operating normally, the first ECU is not a new ECU, and the second ECU is a new ECU; and
   update the stored backup value if: (b) the first ECU is operating normally, the first ECU is not a new ECU, the second ECU is not a new ECU, the new VSL distance value is greater than the stored backup value, and the chassis ID associated with the new VSL distance value matches the chassis ID associated with the stored backup value.

2. The on-board vehicle computer system of claim 1, wherein the first ECU is an engine ECU, and wherein the second ECU is a cab ECU.

3. The on-board vehicle computer system of claim 1, further programmed to:
   calculate a second distance value for the vehicle;
   store the second distance value in the memory of the first ECU of the on-board vehicle computer system; and store a backup value of the second distance value in the memory of the second ECU.

4. The on-board vehicle computer system of claim 3, wherein the second distance value relates to VSL functionality.

5. The on-board vehicle computer system of claim 4, wherein the second distance value is associated with a soft-top speed limiter (SSL) accumulated distance parameter, and wherein the first VSL distance value is associated with an SSL expiration distance parameter.

6. The on-board vehicle computer system of claim 1, further programmed to wirelessly communicate with a computer system that provides remote data processing services, remote storage services, or remote diagnostics services.

7. A method performed by an on-board vehicle computer system of a vehicle, the method comprising:
  obtaining a first vehicle speed limiter (VSL) distance value for the vehicle;
  storing the first VSL distance value in a memory of a first electronic control unit (ECU) of the vehicle;
  storing a backup value of the first VSL distance value in a memory of a second ECU of the vehicle;
  reading data obtained from the first ECU, wherein the data includes VSL data values and diagnostic information, and wherein the VSL data values include a new VSL distance value;
  processing the diagnostic information to determine whether the first ECU is operating normally;
  determining whether the first ECU is a new ECU;
  determining whether the second ECU is a new ECU;
  performing a comparison of the new VSL distance value with the stored backup value;
  performing a comparison of a chassis ID associated with the new VSL distance value and a chassis ID associated with the stored backup value;
  updating the stored backup value if: (a) the first ECU is operating normally, the first ECU is not a new ECU, and the second ECU is a new ECU; and
  updating the stored backup value if: (b) the first ECU is operating normally, the first ECU is not a new ECU, the second ECU is not a new ECU, the new VSL distance value is greater than the stored backup value, and the chassis ID associated with the new VSL distance value matches the chassis ID associated with the stored backup value.

8. The method of claim 7, wherein the first ECU is an engine ECU, and wherein the second ECU is a cab ECU.

9. The method of claim 7, further comprising, by the on-board vehicle computer system of the vehicle:
  calculating a second distance value for the vehicle;
  storing the second distance value in the memory of the first ECU; and
  storing a backup value of the second distance value in the memory of the second ECU.

10. The method of claim 9, wherein the second distance value relates to VSL functionality.

11. The method of claim 10, wherein the second distance value is associated with a soft-top speed limiter (SSL) accumulated distance parameter, and wherein the first VSL distance value is associated with an SSL expiration distance parameter.

12. The method of claim 7, further comprising, by the on-board vehicle computer system of the vehicle, wirelessly communicating with a computer system that provides remote data processing services, remote storage services, or remote diagnostics services.

13. One or more non-transitory computer-readable media having stored thereon program instructions comprising instructions configured to, when executed, cause an on-board vehicle computer system to:
  obtain a first vehicle speed limiter (VSL) distance value for a vehicle;
  store the first VSL distance value in a memory of a first electronic control unit (ECU) of the vehicle;
  store a backup value of the first VSL distance value in a memory of a second ECU of the vehicle;
  read data obtained from the first ECU, wherein the data includes VSL data values and diagnostic information, and wherein the VSL data values include a new VSL distance value;
  process the diagnostic information to determine whether the first ECU is operating normally;
  determine whether the first ECU is a new ECU;
  determine whether the second ECU is a new ECU;
  perform a comparison of the new VSL distance value with the stored backup value;
  perform a comparison of a chassis ID associated with the new VSL distance value and a chassis ID associated with the stored backup value;
  update the stored backup value if: (a) the first ECU is operating normally, the first ECU is not a new ECU, and the second ECU is a new ECU; and
  update the stored backup value if: (b) the first ECU is operating normally, the first ECU is not a new ECU, the second ECU is not a new ECU, the new VSL distance value is greater than the stored backup value, and the chassis ID associated with the new VSL distance value matches the chassis ID associated with the stored backup value.

14. The one or more non-transitory computer-readable media of claim 13, wherein the first ECU is an engine ECU, and wherein the second ECU is a cab ECU.

15. The one or more non-transitory computer-readable media of claim 13, wherein the program instructions further comprise instructions configured to, when executed, cause the on-board vehicle computer system to:
  calculate a second distance value for the vehicle;
  store the second distance value in the memory of the first ECU; and
  store a backup value of the second distance value in the memory of the second ECU.

16. The one or more non-transitory computer-readable media of claim 15, wherein the second distance value relates to VSL functionality.

17. The one or more non-transitory computer-readable media of claim 16, wherein the second distance value is associated with a soft-top speed limiter (SSL) accumulated distance parameter, and wherein the first VSL distance value is associated with an SSL expiration distance parameter.

18. The one or more non-transitory computer-readable media of claim 13, wherein the program instructions further comprise instructions configured to, when executed, cause the on-board vehicle computer system to wirelessly communicate with a computer system that provides remote data processing services, remote storage services, or remote diagnostics services.

* * * * *